United States Patent [19]

Boppel et al.

[11] Patent Number: 5,324,912
[45] Date of Patent: Jun. 28, 1994

[54] METHOD AND APPARATUS FOR MANUFACTURING A TEXTURE DRUM

[75] Inventors: Wolfgang Boppel, Preetz; Gerald Sermund; Michael Wilharm, both of Kiel, all of Fed. Rep. of Germany

[73] Assignee: Linotype-Hell AG, Kiel, Fed. Rep. of Germany

[21] Appl. No.: 50,962

[22] Filed: Mar. 24, 1993

[51] Int. Cl.⁵ ............................................. B23K 15/00
[52] U.S. Cl. ............................ 219/121.19; 219/121.20
[58] Field of Search ...................... 219/121.19, 121.20

[56] References Cited

U.S. PATENT DOCUMENTS

| 3,404,254 | 10/1968 | Jones ................................... 219/121 |
| 4,028,523 | 6/1977 | Anderl et al. ..................... 219/121.20 |
| 4,393,295 | 7/1983 | Beisswenger et al. ........... 219/121.19 |

FOREIGN PATENT DOCUMENTS

| 0119182 | 9/1984 | European Pat. Off. ........ C21D 9/38 |
| 0108376 | 4/1987 | European Pat. Off. ........ B41C 1/04 |
| 2840702 | 4/1939 | Fed. Rep. of Germany ... B21B 1/28 |
| 2354323 | 5/1974 | Fed. Rep. of Germany ... B41C 1/04 |
| 902850 | 9/1945 | France . |
| 1518224 | 3/1968 | France . |

OTHER PUBLICATIONS

Patent Abstracts of Japan, vol. 12, No. 445, Nov. 22, 1988 Yoshio Yamane "Surface Roughening Device for Rolling Roller".
Stahl und Eisen—vol. 110, No. 3, Mar. 14, 1990 R. Pankert: "Aufrauhen von Arbeitswalzen in Kaltwalzwerken".
Optik, vol. 77, No. 2, Sep. 1987, W. Boppel, "Schnelles Elektronenstrahlgravierverfahren zur Gravur von Metallzylindern".

Primary Examiner—C. L. Albritton
Attorney, Agent, or Firm—Hill, Steadman & Simpson

[57] ABSTRACT

In the implementation of the method for manufacturing a texture drum, a surface structure is produced in the region of a surface with an electron beam, preceding a charging occurring within a working interval with an electrons beam having an energy density generating a recess, the texture drum is charged during a pre-treatment interval by an electron beam having an energy density that leaves the surface structure essentially as it was formed.

13 Claims, 7 Drawing Sheets

METHOD AND APPARATUS FOR MANUFACTURING A TEXTURE DRUM

RELATED APPLICATION

This application is related to the following two applications both being filed simultaneously herewith: Wolfgang Boppel application entitled "METHOD AND APPARATUS FOR MANUFACTURING TEXTURE DRUMS", Hill Firm Case No. P-92,1085, International Application No. PCT/DE91/00786; and Wolfgang Boppel et al application entitled "METHOD AND APPARATUS FOR MANUFACTURING TEXTURE DRUMS", Hill Firm Case No. P-92, 1087, International Application No. PCT/DE91/00784.

BACKGROUND OF THE INVENTION

The invention is directed to a method for manufacturing a texture drum, whereby a surface structure is produced in the surface region of the texture drum with an electron beam. The invention is also directed to an apparatus for the implementation of the method.

In the past, various methods have been employed for manufacturing such texture rollers or skin-pass rollers that, in particular, are employed for producing a surface structure on sheet steel. On the one hand, particle charging with steel pellets corresponding to a scrap metal shot occurs second, depressions were implemented in the surface region of the texture drum with the assistance of electroerosion or with the assistance of lasers. The electro-erosion and the particle charging with steel pellets, however, lead to depressions limited with sharp edges whose edge regions tend to break off and, thus, tend to develop dust. Over and above this, an oxidation of the drum metal and, thus, a formation of ash arise in electro-erosion and in laser charging. The number of depressions to be produced on the drum surface when carrying out a processing with lasers is limited by the inertia of the mirrors employed.

German Published Application 28 40 702 discloses a method and an apparatus for improving the quality of fine sheet steel. It is recited in this publication that a surface structure on the drum surface occurs with the assistance of an intermittent energy beam along a helical path. In particular, it is recited that a laser beam can be employed as an energy beam. However, it is also already pointed out that an electron beam can be fundamentally employed. Specific teachings directed to the execution of a method upon employment of an electron beam or for building an apparatus that employs this method are not, however, provided.

EP-A-0 119 182 discloses that a drum surface is charged with the assistance of a laser beam or an electron beam. A helical path in the region of the drum is produced with the assistance of this radiation. In particular, it has been envisioned here to blow a gas, for example oxygen, into the region of the beam charging. An oxidation of the drum metal occurs in the region of the beam charging due to the presence of oxygen. The formation of a crater wall that surrounds a recess generated by the radiation is thereby largely avoided since the material evaporating from or hurled from the recess in a liquid state reacts very quickly with the oxygen.

French Patent 902 850 discloses that a surface structuring be implemented in the region of a texture drum with the assistance of a laser emission, and that the employment of mirrors is avoided in that the texture drum to be charged is rotationally and translationally moved past a stationary laser.

The texture drums manufactured with the known method do not allow any satisfactory useful lives since an intensification of the pressing power during operation is required due to a relatively quickly decreasing roughness of the drum surface. This higher pressing power, however, leads to other sheet metal properties, particularly to changes of the hardness and in the bending properties. Since these changes occur during production, constant product properties cannot be guaranteed.

SUMMARY OF THE INVENTION

It is therefore an object of the present on to improve a method and an apparatus of the type initially cited such that a surface structure that withstands high loads is produced.

With respect to the method, this object is inventively achieved in that the region of the surface 1 of the texture drum 2 is charged by the electron beam 13 within working intervals 60 with an energy density that respectively generates the surface structure in the form of recesses 22 and is charged during pre-treatment intervals 63 preceding the working interval 60 with a lower energy density that respectively leaves the surface structure as it was formed. An advantageous apparatus for the implementation of the method is also provided.

The assistance of this method makes it possible to produce an extremely uniform surface structure in the region of a crater wall surrounding the recess while avoiding sink holes. Avoiding sink holes particularly has the advantage that the surface structure is only subject to slight changes in shape during a charging of sheets and, thus, a long-lasting, uniform charging is guaranteed. Over and above this, avoiding sink holes has the advantage that parts of material are prevented from breaking off. In addition to resulting in a modification of the surface structure, this breakage would particularly result in a development of dust. It is not only sheet steel but any other desired, deformable materials, for example sheet aluminum, that can be charged with texture drums manufactured according to the method. As a consequence of the extremely uniform surface structure that can be produced with the assistance of the method, it is possible to provide a uniform oil film in the region of a surface of a charged sheet, this being particularly advantageous given deep-drawing deformations. Over and above this, the surface structure also lends coatings of the sheet, for example lacquerings, good adhesion.

It is provided according to a preferred embodiment of the invention that a cleaning of the surface of contaminants is implemented during the pre-treatment. This cleaning has the advantage that a durable union of a crater wall arising during the production of the recess with the surface is not disturbed by the presence of contaminants. The implementation of this cleaning with the assistance of a suitably focused electron beam immediately before the production of the recess has the advantage that renewed contamination that is potentially conceivable between the cleaning and the production of the recess can be precluded with great certainty. Over and above this, a qualitatively high-grade cleaning can be implemented as a consequence of the energy density of the electron beam. Over and above this, a temperature elevation of the surface of the texture drum occurs during the implementation of the pre-treatment. This temperature elevation facilitates a union of the crater wall with the surface as a result of a fusing or of an at least extremely intimate conforming of the respective surfaces.

According to another preferred embodiment of the invention, it is provided that the electron beam is focused during the working interval and is defocused during the pre-treatment interval. The variation in the energy density of the electron beam with the assistance of a focusing has the advantage that the variations in the energy density can occurs with extremely short time delays and that ionization effects along the beam propagation are subject to only insignificant variations. A good reproducibility and avoiding transient responses that have a noticeable influence on the electron propagation result therefrom.

It is provided in another embodiment of the invention that an essentially constant sharpness setting of the electron beam is provided both during the working interval as well as during the pre-treatment interval. This constant sharpness setting results therein that an ion equilibrium is present during the entire processing event, this being required for producing an exactly reproducible surface structure. A disturbance of ion equilibrium would have the disadvantage that the working frequency of an apparatus working according to the method would be reduced due to the respective appearance of compensation events.

It is provided in another preferred embodiment that a follow-up of the electron beam matched to the relative motion between the texture drum and the recording element that produces the electron beam is implemented at least during the production of a recess in the surface region of the texture drum. It thereby becomes possible to produce extremely symmetrical formations of the recesses and of the crater walls. Privileged directions in a region of a sheet processed with the texture drum that would negatively influence the liberality in the processing of the sheet are thereby avoided.

Further details of the present invention derive from the following description and from the attached drawings in which preferred embodiments of the invention are illustrated by Way of example.

DESCRIPTION OF THE PREFERRED EMBODIMENTS

Figure 1:
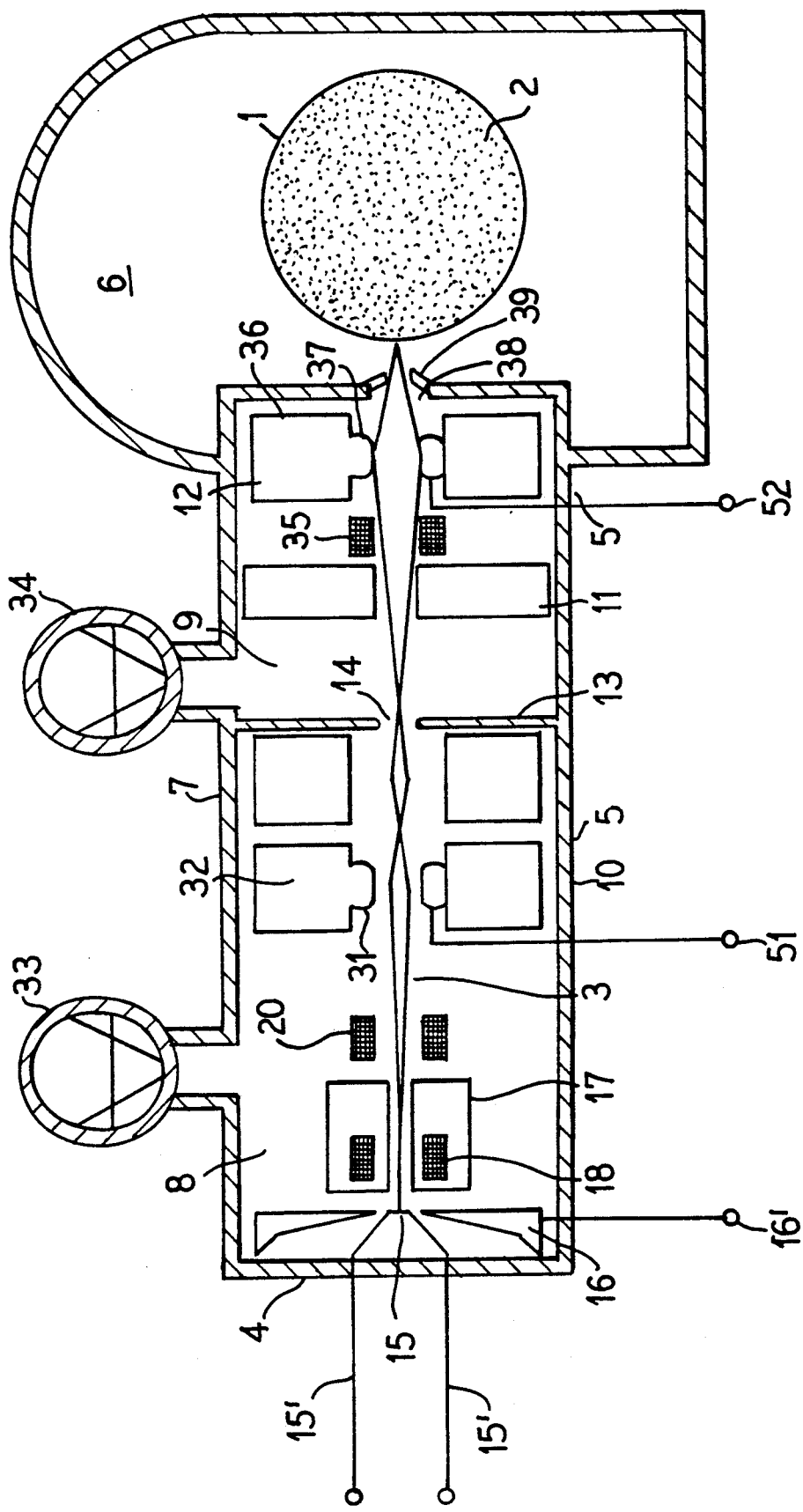
FIG. 1 is a schematic illustration of an apparatus for the manufacture of a surface structure.

FIG. 1 shows a schematic illustration of an apparatus for manufacturing a surface structure in the region of a surface of a texture drum 2. The apparatus is essentially composed of a beam generator 4 that generates an electron beam 3, of a lens system 5, as well as of a vacuum chamber 6 that accepts the texture drum 2. The beam generator 4 and the lens system 5 are arranged in the region of a beam means 7 that is subdivided into a main chamber 8 and into an intermediate chamber 9. The beam generator 4 as well as a focal length setting 10 that is designed as part of the lens system 5 are arranged in the main chamber 8. It is essentially a changeable diaphragm 11 as well as a focusing 12 that are arranged in the region of the intermediate chamber 9, these forming the critical elements of the lens system 5 in common with the focal length setting 10. The main chamber 8 is separated from the intermediate chamber 9 by a vacuum choke 13 that comprises a recess 14 essentially centrally arranged and allowing the passage of the electron beam 3. The vacuum choke 13 makes it possible to provide different pressure conditions in the region of the main chamber 8 and of the intermediate chamber 9. For example, it is thus possible to provide a pressure of approximately $8 \times 0.00001$ bar in the region of the main chamber 8 and a pressure of approximately $8 \times 0.001$ bar in the region of the intermediate chamber 9.

Figure 2:
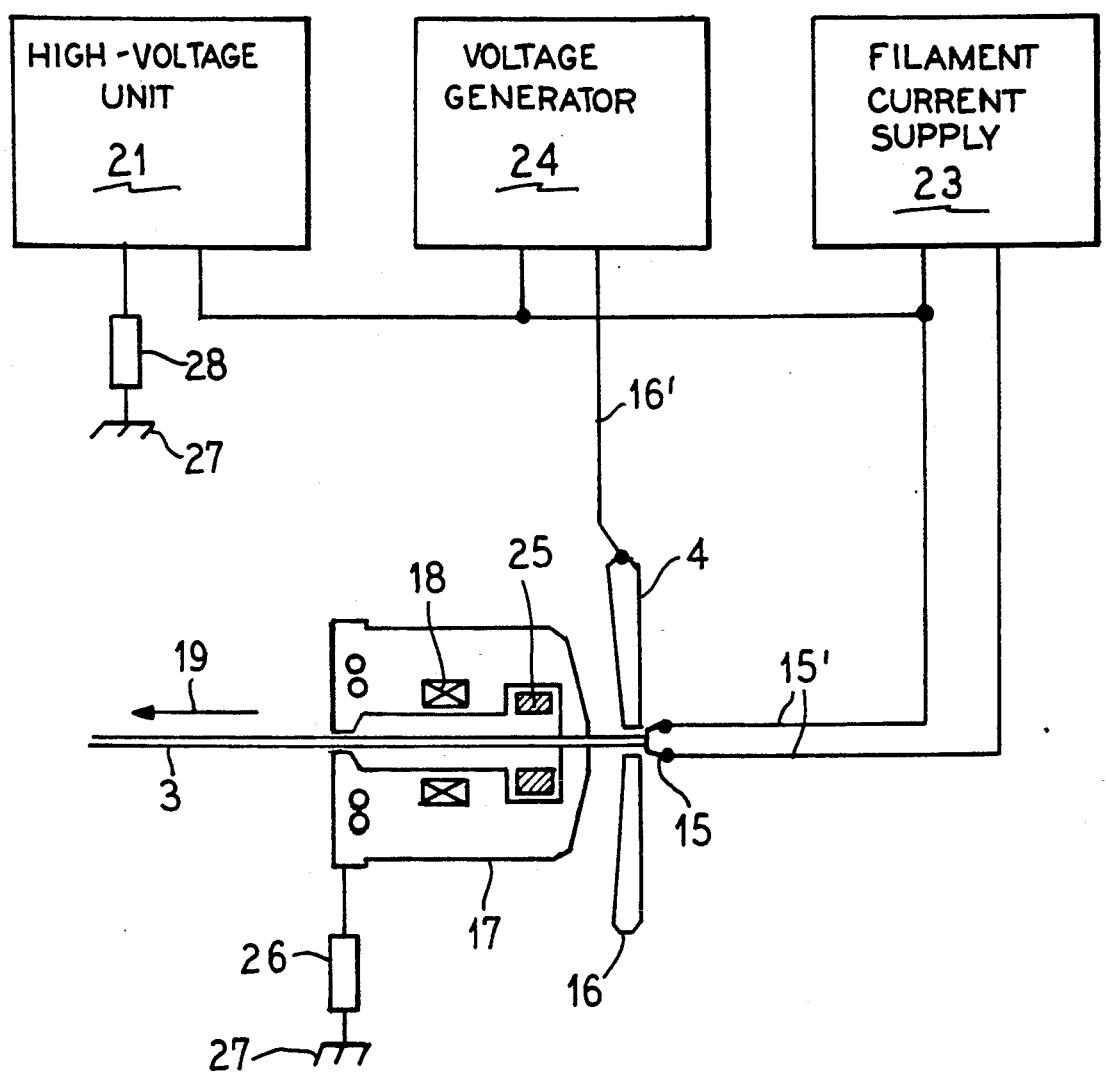
FIG. 2 is a schematic illustration of the beam generating.

The beam generator 4 is essentially composed of a cathode 15, of a Wehnelt cylinder 16, as well as of an anode 17. An anode centerer 18 that focuses the electron beam 3 is arranged in the region of the anode 17. A sequential centerer 20 that likewise undertakes a focusing of the electron beam 3 and avoids scatter losses is arranged following the anode 17 in the propagation direction of the electron beam 3. The cathode 15 is connected via a line 15' to a high-voltage unit 21 (FIG. 2).that generates a voltage up to approximately $-50$ kilovolts. A typical value lies at approximately $-35$ kilovolts. Given such a voltage, recesses 22 (FIG. 4) having a typical depth of approximately 7 micrometers can be produced per microsecond in the region of the surface 1. Given a reduction of the high-voltage to approximately $-25$ kilovolts, the typical depth of the recess 22 (FIG. 4) amounts to approximately 3 to 4 micrometers per microsecond. Over and above this, the cathode 15 is connected to a filament current supply 23 (FIG. 2). The Wehnelt cylinder 16 is fed via a line 16' by a voltage generator 24 that generates a potential of approximately $-1000$ volts in comparison to the voltage present at the cathode 15. An ion trap 25 that diverts ions appearing in the region of the anode 17 out of the region of the electron beam 3 is provided in the region of the anode 17 next to the centering coils that form the anode centerer 18. The anode 17 is connected via a resistor 26 to a grounding terminal 27. Over and above this, the high-voltage unit 21 is also connected in the region of a reference terminal to ground via a resistor 28. In particular, tungsten wires are suitable as the material for the cathode 15.

Figure 4:
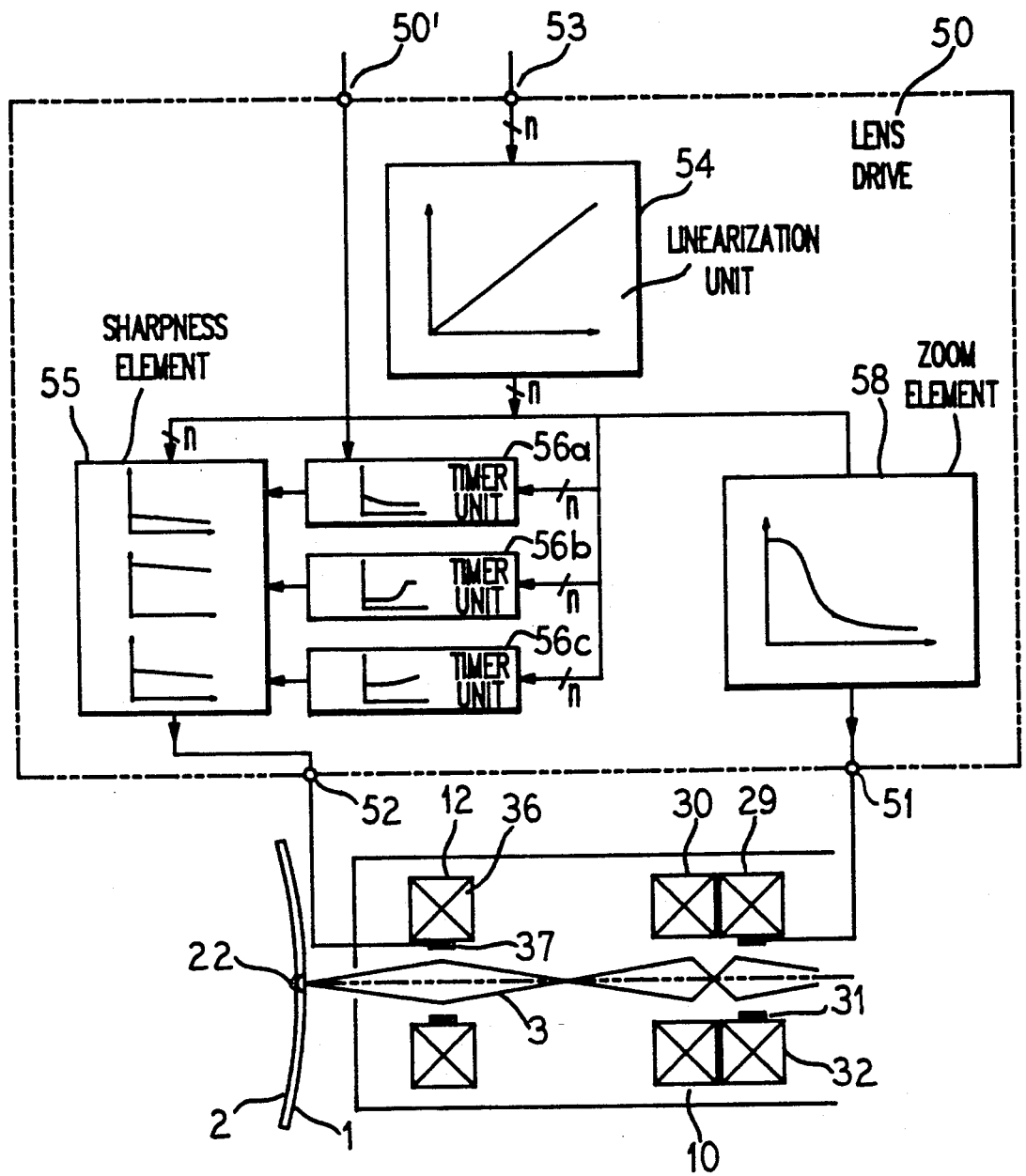
FIG. 4 is a block circuit diagram of the lens drive.
Figure 5:
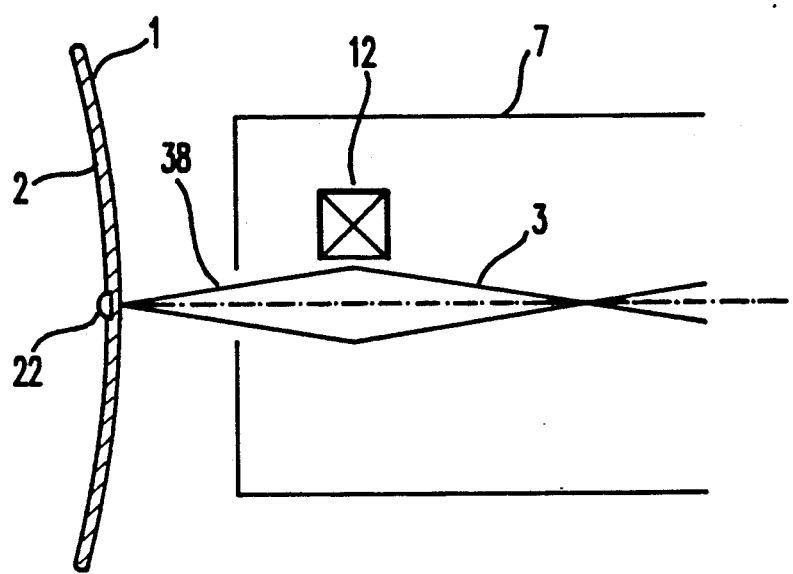
FIG. 5 is a schematic illustration of a focused electron beam.
Figure 6:
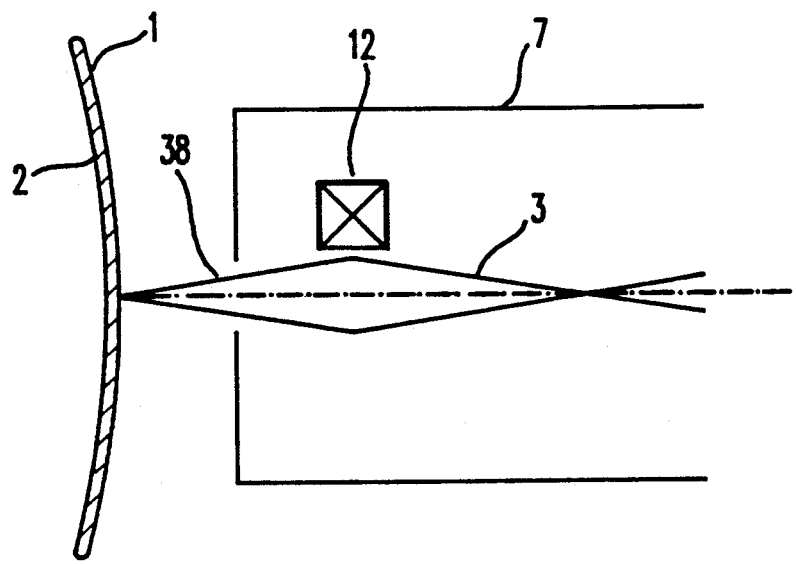
FIG. 6 is a schematic illustration of a defocused electron beam.
Figure 7:
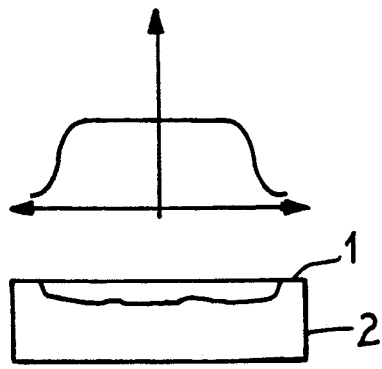
FIG. 7 is an allocation of an electron beam intensity to a charged surface during a pre-treatment.

The focal length setting 10 is constructed of a first zoom lens 29 as well as of a second zoom lens 30 that are arranged following one another in propagation direction 19 (FIG. 4). The first zoom lens 29 is composed of a dynamic lens 31 as well as of a static lens 32. The second zoom lens 30 is designed without a dynamic lens 31. The vacuum in the region of the main chamber 8 is maintained by a vacuum pump 33 and the vacuum in the region of the intermediate chamber 9 is maintained by a vacuum pump 34 (FIG. 1). In the vacuum in the region of the intermediate chamber 9 particular, it has been envisioned to design the pumps 33, 34 as turbomolecular pumps. A centerer 35 that avoids scatter losses of the electron beam 3 is provided in the region of the intermediate chamber 9 between the changing diaphragm 11 and the focusing 12. The focusing 12 is essentially composed of a static lens 36 and of a dynamic lens 37. The dynamic lenses 31 and 37 are each respectively arranged in the region of the side surfaces of the static lenses 32 and 36 facing toward the electron beam 3. At that side facing toward the vacuum chamber 6, the means 7 comprises an exit opening 38 in which a nozzle 39 is arranged.

Figure 3:
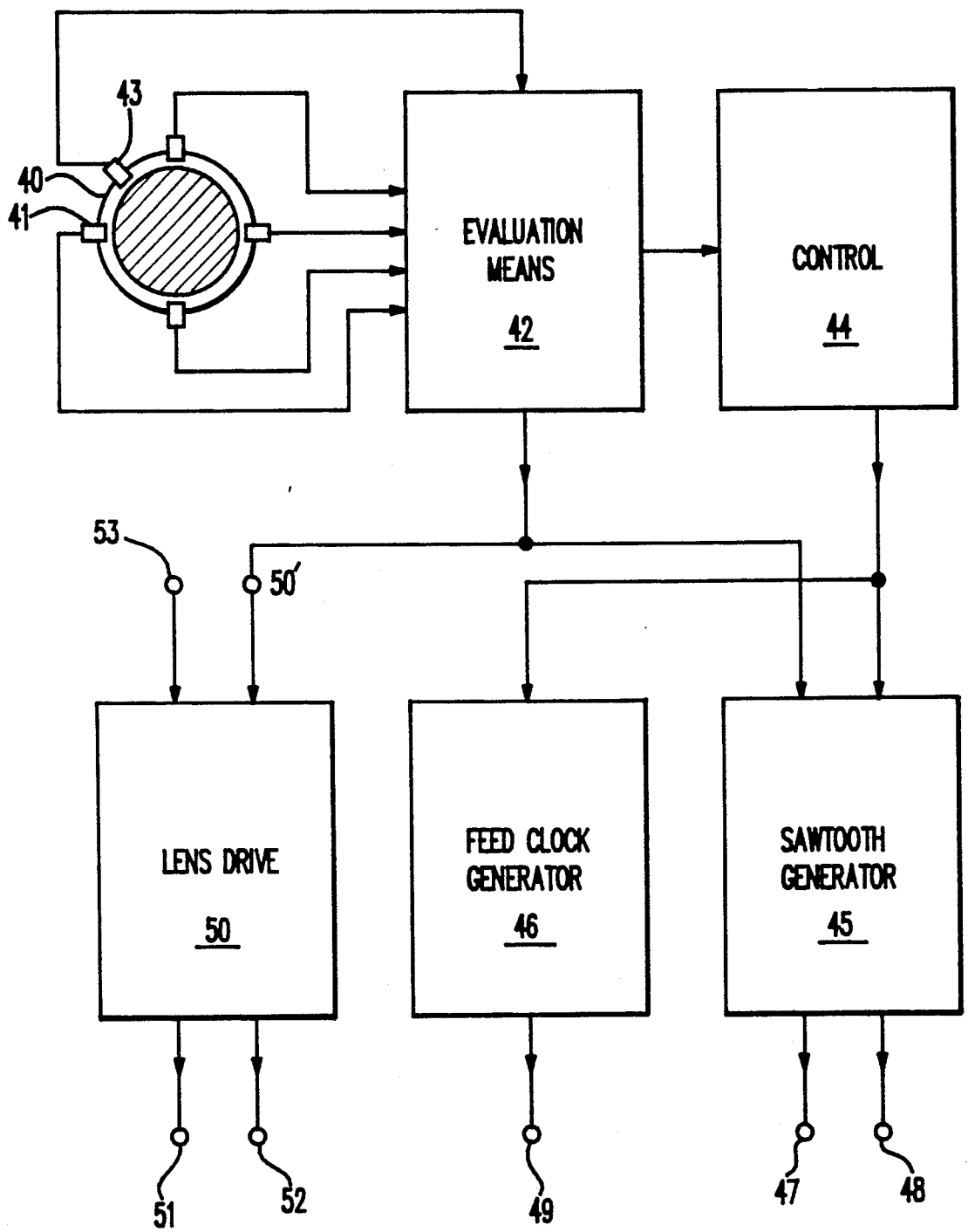
FIG. 3 is a block circuit diagram of the control of the apparatus.

For controlling the reproducible positioning of the recesses 22 in the region of the surface I of the texture drum 2, a grid disk 40 synchronized with the rotational motion of the texture drum 2 is provided, this grid disk 42 being connected to an evaluation means 42 via a pick-up 41 (FIG. 3). The evaluation means 42 makes a clock available for following control elements, this clock enabling an exact acquisition of a current orientation of the texture drum 2. A defined definition of a reference point occurs with the assistance of a zero point acquisition means 43. The evaluation means 42 is connected to a control 44 that, for example, can be designed as a phase-locked-loop circuit. The control 44 supplies a sawtooth generator 45 as well as a feed clock generator 46. The sawtooth generator 45 comprises an engraving sawtooth terminal 47 as a well as feed sawtooth terminal 48. The feed clock generator 46 is provided with a feed stepping motor terminal 49. The evaluation unit 42 is connected to the sawtooth generator 45 and is connected via a control terminal 50' to a lens drive 50. The lens drive 50 comprises a zoom lens terminal 51, a sharpness lens terminal 52 and a control terminal 53.

For driving the lens system 5, a plurality of characteristics elements for signal shaping are provided in the lens drive 50 (FIG. 4). Via the control terminal 53, an actuating variable for the electron beam recording element that defines the geometry of the recesses 22 to be produced is forwarded via a linearization unit 54 to a sharpness element 55, to timer units 56a, 56b and 56c as well as to a zoom element 58. The input actuating variable is converted with characteristics in the sharpness element 55 into adjustment values for the focusing 12 that are supplied to the dynamic lens 37 of the focusing 12. The characteristics of the zoom element 58 converts the actuating variable into corresponding adjustment values for the focal distance setting 10 that proceed to the dynamic lens 31.

The clock acquired in the evaluation unit 42 and the sawtooth signal generated in the sawtooth generator 45 are employed for the chronological coordination of the method sequences in the manufacture of the recesses 22 (FIG. 4).

The time interval provided for the manufacture of a recess 22 corresponds to a cycle of the sawtooth signal 59 (FIG. 10), whereby the respective start of a time interval is marked by a clock.

Figure 8:
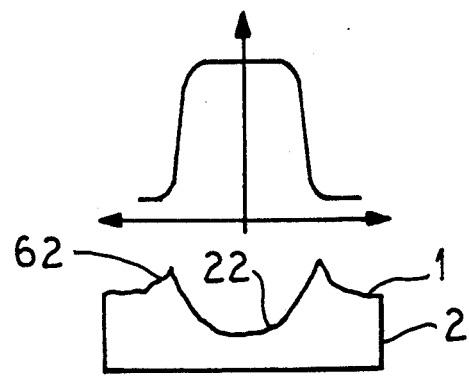
FIG. 8 is an allocation of an electron beam intensity to a charged surface during the production of a recess.
Figure 9:
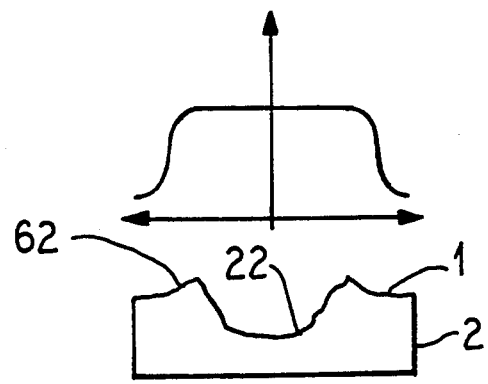
FIG. 9 is an allocation of an electron beam intensity to a charged surface during an aftertreatment.
Figure 10:
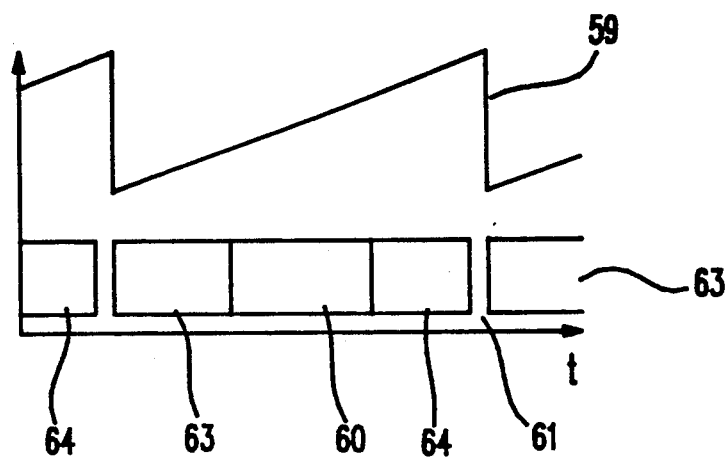
FIG. 10 is a time diagram directed to the allocation of pre-treatment, working and after-treatment intervals.

The time interval covers at least one working interval 60 and one intermediate interval 61. A pre-treatment interval 63 preceding the working interval 60 and/or an after-treatment interval 64 following the working interval 60 are also preferably provided (FIG. 10). During the working interval 60, the focusing 12 is controlled such that the electron beam 3 has an energy density that produces the recess 22, or enlarges it. A slight melting of a crater wall 62 (FIGS. 8 and 9) surrounding the recess 22 occurs at least during the transition from the working interval 60 to the intermediate interval 61, this slight melting leveling irregularities that may be present.

Figure 11:
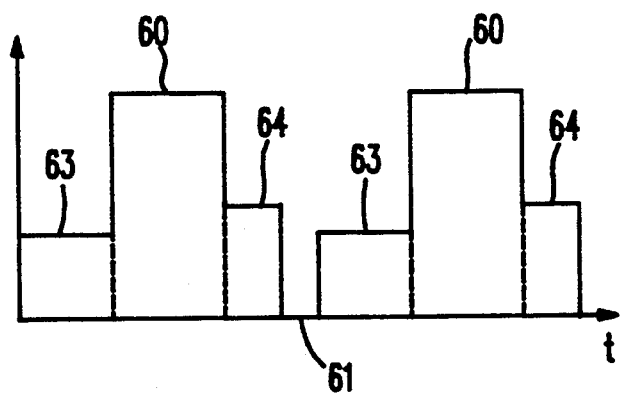
FIG. 11 is a time diagram of a multiple pulse drive wherein two successively following working intervals have a respective pre-treatment and after-treatment interval allocated to them.

A cleaning and a pre-tempering of the area occupied by the recess 22 and by the crater wall 62 occurs during the pre-treatment interval 63. A durable union of the crater wall 62 with the surface 1 is assured as a result of the pre-treatment. A melting of the crater wall 62 occurs for a defined time span during the after-treatment interval 64. In particular, it has been envisioned to provide at least two working intervals 60 during a time interval, the recess 22 being manufactured therein. These working intervals 60 are separated by a further intermediate interval 61 (FIG. 11). Fundamentally, it is also conceivable to allocate a plurality of cycles of the sawtooth signal 59 to the time interval and, for example, to provide a working interval during every cycle.

The respective chronological duration of the working interval 60, of the pre-treatment interval 63 and/or of the after-treatment interval 64 is calculated in the timer units 56a, 56b and 56c of the lens drive 50 (FIG. 4) dependent on the actuating variable, in that the actuating variable is converted with characteristics into the clock signals that define the respective chronological duration of the intervals.

The timer unit 56a that defines the chronological duration of the pre-treatment interval 56 is triggered by the clock at the control terminal 50'. After the expiration of the pre-treatment interval 63, the timer unit 56b that defines the chronological duration of the working interval 60 is activated by the timer unit 56a. After the expiration of the working interval 60, the timer unit 56c that defines the chronological duration of the after-treatment interval 64 is started by the timer unit 56b.

The clock signals acquired in the timer units 56a, 56b, and 56c are supplied to the sharpness element 55 and control the output of the various setting values for the focusing 12 in the pre-treatment interval 63, in the working interval 60 and/or the after-treatment interval 64.

A compensation of the relative motion of the texture drum 2 vie-a-vie the nozzle 39 can be undertaken via a follow-up of the electron beam 3. As a result thereof, the electron beam 3 remains exactly directed onto a preselected region and this leads to the formation of extremely symmetrical recesses 22. As a result of the extremely short time delays in the drive of the lens system 5, approximately 150,000 recesses 22 can be manufactured per second. Given employment of suitably fast control devices, it is also possible to realize clock frequencies of 300,000 through 600,000 recesses per second. In order to enable these clock frequencies, the texture drum is rotatorily charged with a rotational speed of approximately 10 revolutions per second and is provided with a suitable translational motion. Given a time span of approximately 16 microseconds for generating a recess 22, a complete texture drum 2 can be processed in approximately 45 minutes. The energy absorption by the texture drum amounts to only approximately 500 watts in this time. Undesirable variations in the region of the surface I due to thermal warpings or similar events are thus precluded with high probability. A time of approximately 1 microsecond has proven expedient as the time span for the intermediate interval 61. The recess 22 and the crater wall 62 occupy a region having a diameter of approximately 30 through 400 micrometers.

Although various minor changes and modifications might be proposed by those skilled in the art, it will be understood that we wish to include within the claims of the patent warranted hereon all such changes and modifications as reasonably come within our contribution to the art.

We claim:

1. A method for manufacturing a texture drum, comprising the steps of:
   producing recesses in a surface region of the texture drum with an electron beam;
   creating the recesses by charging the surface region of the drum with the electron beam during a working interval; and 'charging the surface region with the electron beam in a pre-treatment interval preceding the working interval wherein the electron beam has a respective lower energy density than a respective energy density during a succeeding working interval, said lower energy density being selected to substantially leave the surface region where the recess is to be provided as it was formed.

2. A method according to claim 1 wherein during the pre-treatment interval a cleaning of the surface of contaminants occurs.

3. A method according to claim 1 wherein during the pre-treatment interval a temperature elevation of the surface region occurs.

4. A method according to claim 1 wherein during the pre-treatment interval at least one portion of the surface region is melted.

5. A method according to claim 1 wherein the surface region of the texture drum corresponds to a size of the recess to be produced as well as a size of a crater wall surrounding said recess, said region being charged by the electron beam during the pre-treatment interval.

6. A method according to claim 1 wherein the electron beam follows up movement of the texture drum at least during the working interval.

7. A method according to claim 1 wherein the electron beam is more highly focused during the working interval than during the pre-treatment interval.

8. A method according to claim 1 wherein a sharpness setting of the electron beam is undertaken both during the working interval as well as during the pre-treatment interval.

9. A method according to claim 1 wherein a melting of the crater wall is caused by the electron beam focused onto a region of the recess and of the crater wall during an after-treatment interval which follows the working interval.

10. A method according to claim 1 including the step of clocking a focusing of the electron beam based on a rotational positioning of the texture drum.

11. A method for manufacturing a texture drum, comprising the steps of:
   producing a recess in a surface region of the texture drum with an electron beam;
   creating the recess by charging the surface region of the drum with the electron beam during a working interval; and
   charging the surface region with the electron beam in a pre-treatment interval preceding the working interval wherein the electron beam has a respective lower energy density than a respective energy density during a succeeding working interval, said lower energy density being selected to substantially leave the surface region in a same general shape as it had prior to application of the electron beam during the pre-treatment interval, but cleaning contaminants from the surface region.

12. An apparatus for manufacturing a texture drum, comprising:
   means for emitting an electron beam for charging a surface region of the texture drum; and
   means for applying the electron beam to said surface region with a given respective energy density during a working interval and a relatively lower respective energy density during a pre-treatment interval preceding the working interval, said lower energy density being selected so as to substantially leave a general shape of the surface region unaltered.

13. An apparatus for manufacture of a texture drum on which a surface is generated in a surface region by an electron beam, comprising:
   a vacuum chamber means for accepting the texture drum;
   a beam generator means connected to the vacuum chamber for producing an electron beam;
   focal length means having a first lens system with a long focal length which comprises a static lens and a dynamic lens, and a second lens system with a short focal length;
   focusing means having a third lens system comprising a static lens and a dynamic lens;
   a first control means connected to the beam generator means;
   a second control means connected to the focal length means and to the focusing means;
   the second control means comprising a time control means connected to at least one of said focal length means and focusing means for time/dependent control of energy density of the electron beam by adjusting at least one of said dynamic lens of the focal length means or dynamic lens of the focusing means so that the energy density of the electron beam is controlled such that the surface region of the texture drum is charged in working intervals with a respective energy density that generates the surface region in the form of recesses and wherein the surface structure is charged within a pre-treatment interval preceding each of the working intervals with a respective lower energy density selected so as to leave the surface region substantially as it was formed.

* * * * *